US010593125B2

United States Patent
Arpa et al.

(10) Patent No.: US 10,593,125 B2
(45) Date of Patent: Mar. 17, 2020

(54) 2D-3D SCULPTURE PAINTINGS

(71) Applicants: Sami Arpa, Lausanne (CH); Sabine Süsstrunk, Lausanne (CH); Roger D. Hersch, Epalinges (CH)

(72) Inventors: Sami Arpa, Lausanne (CH); Sabine Süsstrunk, Lausanne (CH); Roger D. Hersch, Epalinges (CH)

(73) Assignee: Ecole Polytechnique Fédérale de Lausanne (EPFL), Lausanne (CH)

( * ) Notice: Subject to any disclaimer, the term of this patent is extended or adjusted under 35 U.S.C. 154(b) by 21 days.

(21) Appl. No.: 16/039,350

(22) Filed: Jul. 19, 2018

(65) Prior Publication Data

US 2020/0027279 A1 Jan. 23, 2020

(51) Int. Cl.
*G06T 19/20* (2011.01)
*G06T 11/60* (2006.01)
*G06T 17/20* (2006.01)
*G06T 11/80* (2006.01)

(52) U.S. Cl.
CPC .............. *G06T 19/20* (2013.01); *G06T 11/60* (2013.01); *G06T 11/80* (2013.01); *G06T 17/20* (2013.01)

(58) Field of Classification Search
None
See application file for complete search history.

(56) References Cited

U.S. PATENT DOCUMENTS

| 2012/0268410 A1* | 10/2012 | King | G06F 3/04883 |
| | | | 345/173 |
| 2017/0262623 A1* | 9/2017 | Plenderleith | G06F 21/36 |

OTHER PUBLICATIONS

Zeng et al. Region based bas relief generation from a single image, Graphial Models 76, 2014, pp. 140-11.*
Zhongping et al. Bas-Relief modeling from Normal Images with Intuitive Styles, Journal of Latex Class Files vol. 6, No. 1 Jan. 2007.*
P. Cignoni, C. Montani, and R. Scopigno. "Computer-assisted generation of bas-and high-reliefs." Journal of graphics tools vol. 2. No. 3 (1997): 15-28.
W. Song, A. Belyaev, and H.P. Seidel. "Automatic generation of bas-reliefs from 3d shapes." Shape Modeling and Applications, 2007. SMI'07. IEEE International Conference on. IEEE, 2007.
T. Weyrich, J. Deng, C. Barnes, S. Rusinkiewicz, A. Finkelstein, "Digital bas-relief from 3D scenes." ACM Transactions on Graphics (TOG) 26.3 (2007): Article 32.

(Continued)

*Primary Examiner* — Frank S Chen

(57) ABSTRACT

We disclose a method for synthesizing by computer an artwork where 2D and 3D contents are integrated within a same composition. Such an artwork creates plausible effects for the viewers by showing a different relationship between 2D and 3D at each viewing angle. Methods are proposed for ensuring the continuity between the 2D and the 3D parts in terms of mesh geometry and reflected colors. The user selects from a given scene a region of interest (ROI) to be reproduced in 3D. A flat rendering grid is created that matches the topology and tesselation of the ROI. The ROI is attached to the rendering grid. To enhance the continuity between the 2D and the 3D parts of a scene object, the 2D part of the object can be represented as bas-relief. Designers can create 2D-3D sculpture paintings for decoration, exhibitions, and homes.

22 Claims, 10 Drawing Sheets

(56) References Cited

OTHER PUBLICATIONS

Schüller, D. Panozzo, and O. Sorkine-Hornung. "Appearance-mimicking surfaces." ACM Transactions on Graphics (TOG) vol. 33, No. 6, article 216, 2014.

S. Arpa, S. Süsstrunk, and R.D. Hersch. "High reliefs from 3D scenes." Computer Graphics Forum. vol. 34. No. 2. 2015, pp. 253-263.

O. Sorkine et al. "Laplacian surface editing." Proceedings of the 2004 Eurographics/ACM SIGGRAPH symposium on Geometry processing. ACM, 2004.

M. Heynick and I. Stotz, "3D CAD, CAM and Rapid Prototyping", LAPA Digital Technology Seminar, EPFL, May 2007.

\* cited by examiner

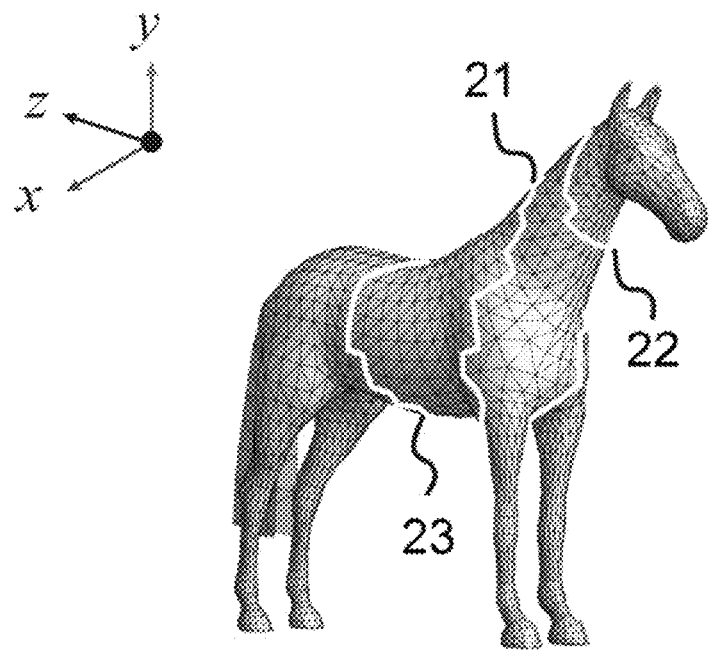
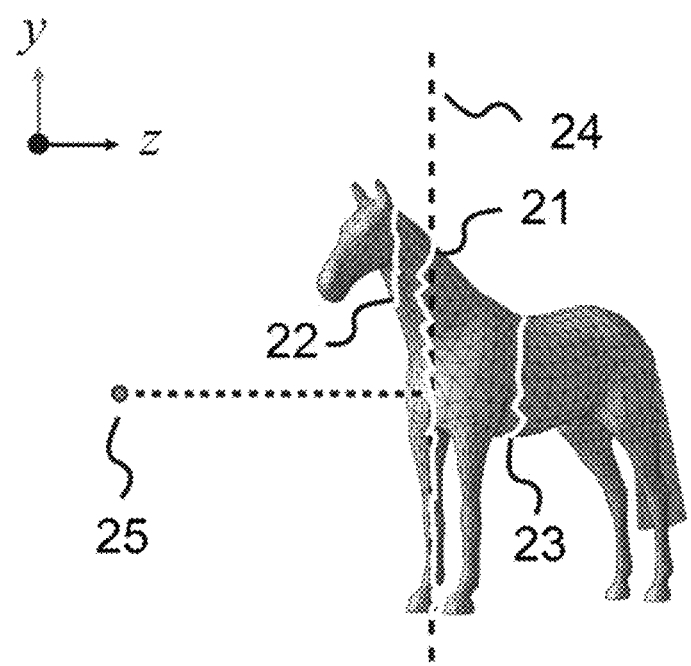
FIG. 2

2D-3D SCULPTURE PAINTINGS

BACKGROUND OF THE INVENTION

The present invention is related to the field of partially or fully automatic synthesis of art pieces by computer executed methods such as the synthesis of digital reliefs, the synthesis of sculptures, and, more specifically, to methods for the synthesis of bas-reliefs and of high reliefs.

In the present disclosure, non-patent publications are cited by a number, e.g. [1], which refers to the publications listed in section "Cited non-Patent Publications" at the end of the description.

We disclose a system for generating by computer pieces of art that are partly sculpture and partly image, incorporating visually smooth transitions between 3D scene objects and their flat representations. We provide new means of expression combining within a same composition 2D and 3D scene elements. An observer looking at the final printed 2D-3D artwork resulting from such a composition cannot easily distinguish the 2D part and the 3D part.

Automatic generation of artwork by computer executed methods has been a significant research and development topic. The goal of some of these works is either to create tools for the artists or to generate artworks in a completely automated manner. Our invention is related to the domain of relief generation. Relief synthesis is a sculptural technique where the sculpted elements are attached to a background surface (e.g. relief plane). There are different types of reliefs depending on the attachment type of the sculpted part. If the sculpted parts are designed only as tiny elevations from the surface without undercuts, the relief is called bas-relief (or low-relief). If parts detach from the surface as 3D shapes, the relief is called high relief.

The main approach for designing a bas-relief is based on a height-field [1]. For a given camera position, the input scene is captured as a height-field (also called depth field). This then defines the elevation ranges on a regular mesh grid. The main challenge of the bas-relief methods consists in mapping the height-field of the scene to a limited range of elevations while preserving the details of the original scene. Initial methods use non-linear compression operations. However, they cannot generate plausible reliefs for higher depth range variations. Recent methods [2, 3] use the gradient domain to compress the height field. These methods preserve many details of the scene at very limited height ranges.

For the high relief, the height field representation of the bas-relief is not applicable. Instead, the 3D scene geometry should be directly connected with the relief plane. Schüller et al. [4] introduce a generalization of bas-relief synthesis for arbitrary target surfaces. Since this method does not require a height field as input data but uses the 3D scene geometry, it can also be used to generate high reliefs. A recent work by Arpa et al. [5] creates high reliefs that can be viewed from a wide range of viewing angles with an appearance similar to the original 3D shape. Well-chosen control points enable attaching the scene to the relief plane.

Our invention has similarities to high reliefs. However, the challenges are different. Although, in both, the 3D parts are attached to a plane, in high reliefs there is no smooth transition between the planar projected elements and the 3D elements. All forms are in 3D within a limited space. In the present invention, since some parts of the scene are projected onto the rendering plane, the method of attachment aims at ensuring a seamless continuity between 2D and 3D regions of a scene. Such a seamless continuity is achieved with the addition of relief profiles and with smoothing operations relying on optimization.

Artists who blend a painting and a sculpture manually must meet several challenges. First, the geometric visual information of a painting does not fundamentally change as a function of the viewing position while a sculpture reveals new information at each viewing angle. In sculpture paintings, each new viewing position creates a new composition of 2D and 3D scene elements. Creating a composition that provides plausible percepts for many different viewing angles is challenging. In addition, the textures of the 2D and 3D parts need to be blended. Lighting can dramatically change the perception of the 3D elements. Depending on the type of light and its position, the diffuse shading, specular highlights, and shadows can change to a great extent the appearance of the 3D elements. Contradictions with the 2D part may arise.

The present invention discloses methods to synthesize by computation a piece of art where 2D and 3D parts of some salient scene objects are smoothly integrated.

SUMMARY

We propose a computer based method for the semi-automatic or automatic computation of the mesh surface of a 2D-3D piece of art made of a scene comprising at least one salient object, where the surrounding scene portion is rendered as a substantially flat 2D reproduction, and where the object is reproduced partly as flat, partly as bas-relief and partly as 3D emerging from the substantially flat 2D and bas-relief parts of the composition.

The invented method starts from an input 3D scene comprising in its foreground at least one salient object. Often the input scene comprises also background 3D elements and/or possibly a 2D image, grayscale or color, placed in the 3D scene. In general, the scene without the salient object is rendered on the rendering plane as a flat 2D reproduction. In order to synthesize a 2D-3D composition, where the salient object is reproduced partly as flat, partly as bas-relief and partly as 3D, the steps that follow are performed by software functions:
 (i) intersection of the salient object surface with a cut plane thereby obtaining on one side of the cut boundary a region of interest of the object called ROI that is reproduced in 3D;
 (ii) aligning and smoothing the cut boundary along the cut plane;
 (iii) creating a grid on the rendering plane and a hole on this grid whose border matches the boundary of the ROI, carried out by projecting the ROI boundary onto the rendering plane;
 (iv) attaching the ROI to the rendering grid at the border of said hole;
 (v) adding bas-relief profiles to the non-ROI part of the salient object and ensuring smoothness between flat, bas-relief and 3D object parts by an optimization procedure with the additional constraint that the silhouette of the non-ROI part of the object remains close to the rendering grid.

The surface of the salient object within the original scene is formed by a mesh whose vertices and edges are well defined. Aligning and smoothing the boundary along the cut plane is carried out by forcing boundary vertices to be located close to the cut plane and by refining the location of mesh vertices with an optimization procedure that minimizes differences between original differential coordinates of the mesh vertices and differential coordinates of the refined mesh vertices.

The non-ROI part of the salient object is attached to the rendering plane by forcing its silhouette to remain on the rendering plane or very close to it. This is performed by applying an optimization procedure that keeps the elevation from the rendering plane of the silhouette vertices of that salient object very small and that also minimizes differences between original differential coordinates of the mesh vertices and differential coordinates of the refined mesh vertices. Silhouette vertices are those which have a high gradient of their depth profile.

Visually disturbing contradictions should be avoided between surface shading (i.e. variations of light reflected from the scene elements onto the viewer's eyes according to their surface normals) that is observed when viewing the actual 2D-3D piece of art and the surface shading due to the lighting conditions in the original scene, rendered onto the rendering plane. The solution is to create well defined lighting conditions in the original scene and bake the resulting shading into the texture of the reproduced scene elements. Then when observing the fabricated 2D-3D piece of art in ambiant illumination conditions, surface shading contradictions will not be apparent.

The texture of the scene background and of the non-ROI part of the scene object is created by projection onto the rendering plane, i.e. onto the relatively flat parts of the composition. The texture of the ROI is preserved on the 3D part of the composition. Before generating the textures of the resulting 2D-3D composition, baking can be applied. Then, the modified texture is associated to the resulting 2D-3D composition.

The resulting 2D-3D composition of the scene incorporating a salient object is specified by a surface mesh and by textures. This surface mesh together with the textures are sent to a 3D printing system which manufactures the piece of art by 3D printing with the selected material, e.g. plastic, possibly with color. Many existing 3D printing systems convert the surface mesh description into slices printable by a 3D printer.

The salient objects that can be reproduced by 2D-3D sculpture paintings comprise animals, vegetals, humans, fashion objects, fictional characters, vehicles, bottles, machines, robots, landscape elements, buildings, houses and furniture.

Thanks to the invented method, one can produce a 2D-3D piece of art that represents a scene, comprising a salient object where the scene portion surrounding the object is rendered as a flat 2D reproduction, where the salient object is reproduced partly as flat, partly as bas-relief and partly as 3D and where the transitions between the flat, bas-relief and 3D parts of the object are smooth. This makes it difficult for an observer looking at the piece of art from various angles to perceive the exact position of the transitions between the flat, the bas-relief and the 3D parts of the object.

The 2D-3D artworks create plausible effects for the viewers by showing a different relationship between 2D and 3D at each viewing angle. As the viewing angle is changed, an observer can see 3D elements emerging from the scene, but without being able to sharply locate the boundary between flat parts, low elevation parts and parts emerging as 3D. This yields a very interesting aesthetical effect.

The invented method can be used to reproduce several 2D-3D objects within a scene by applying the method object by object. The method can also be easily extended by persons knowledgeable in the art to handle composite objects made of several parts, such as a horse carrying a carriage or a two headed hydra whose heads are represented as 3D object parts.

BRIEF DESCRIPTION OF THE DRAWINGS

For a better understanding of the present invention, one may refer by way of example to the accompanying drawings, in which:

FIG. 2 shows a scene object (horse) viewed from two different positions, with the boundary of the region of interest (ROI) 21 and fixation boundaries 22, 23;

DETAILED DESCRIPTION OF THE INVENTION

Figure 1:
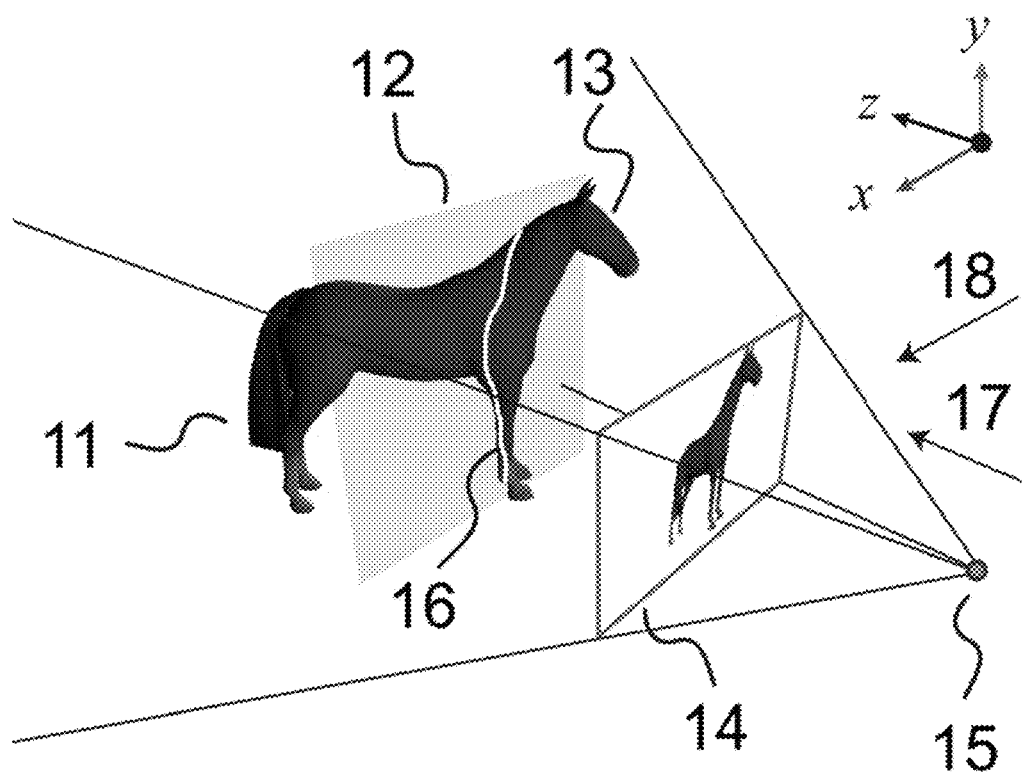
FIG. 1 shows an input scene with a cut plane, rendering plane and center of projection that enable creating sculpture paintings.

We propose a synthesis method where parts of a given 3D scene are rendered on a substantially planar surface ("rendering plane") and user selected parts emerge as 3D shapes from the rendering surface. The final geometry is a fully connected mesh where 2D parts and 3D parts are within the same continuum. In order to provide an improved means of user interaction, we define two separate planes: a rendering plane that is the base plane (or background plane) for representing the final composition and a cut plane which provides user control over the selection of the region of interest ("ROI") of an object within the scene. This region of interest is to be reproduced in 3D. The proposed method and system aim at creating a seamless continuity between the 2D and the 3D parts of an object surface, allowing the user to perceive from a variety of viewing positions plausible compositions comprising 3D elements emerging from the rendering plane.

The initial challenge consists of matching the topologies and tessellations of the 3D part and the 2D part in order to create an attachment ensuring a smooth transition between the two parts. We cut the region of interest (3D part of object) directly from the scene, create a 2D grid that has homeomorphic boundaries and the same topology as the 3D part, and attach this 3D part to the grid. A simple cut operation by intersecting the 3D mesh with a plane creates a boundary polygon that may provide a smooth transition only if the result is observed along the camera direction (FIG. 1, 17) e.g. from the center of projection. However, such a composition yields jagged edges once the final 2D-3D artwork is perceived along a direction different from the camera direction. Therefore, we generate a cut polygon which looks smooth both from the camera direction and from other directions.

The second challenge is to match shading and textures. In order to be perceived as parts of the same composition, the 2D and 3D elements of the final composition have to match perfectly. Sudden variations of the normals between the flat part and the 3D part would highlight the boundary between the 2D part and the 3D part of the same object. In order to create smooth transitions, we introduce a bas-relief profile on the non-ROI part of the object. A bas-relief profile together with an optimization procedure provide both a smooth transition in the neighborhood of 2D-3D boundaries, and ensure consistency between the material appearances of the flat, bas-relief enhanced and the 3D part of an object. The smoothing optimization may also have the effect that a portion of the non-ROI object part becomes flat. We also define pre-lighting conditions that are baked into the textures of the scene. We may also possibly use style transfer to match the scene background and the object that comprises a region of interest emerging in 3D.

In a preferred embodiment, we consider a method implemented by executable software functions. The 2D-3D sculpture painting designer initially takes a 3D synthetic scene mesh as his input and a software function renders it onto a rendering plane. Then we allow the user to select a region of interest (ROI), delimited by a cut plane. By refining the mesh along the boundary of the cut positions, a software function extracts the region of interest (ROI) in a seamless way. Another software function then locates by projection the boundary vertices on the rendering plane and creates a grid on the rendering plane that incorporates in its border the projection of the boundary of the ROI. After attaching the scaled and translated ROI to the rendering grid along the boundary vertices, a further software function creates bas-relief profiles on the non-ROI part of the object and ensures by optimization a smooth transition between the flat part, the bas relief part and the 3D part of the composition. Finally, corresponding textures are mapped onto the flat, the bas-relief and the 3D parts. The final result is a surface that is formed by a fully connected mesh that can be 3D printed by a 3D printing system, possibly in color. In the special case where the cut plane and the rendering plane are identical, there is no need to scale and translate the ROI before attaching it to the rendering plane.

Vocabulary, Formulations and Notations

In the description that follows, the method steps are described from the point of view of the inventors, using the "we" subject form. However, in a preferred embodiment, these method steps are implemented by software functions that are called from a main program. In the following text, "rendering in 2D" means rendering an initial 3D scene possibly comprising a freely positioned 2D image onto a 2D rendering plane.

Figure 6:
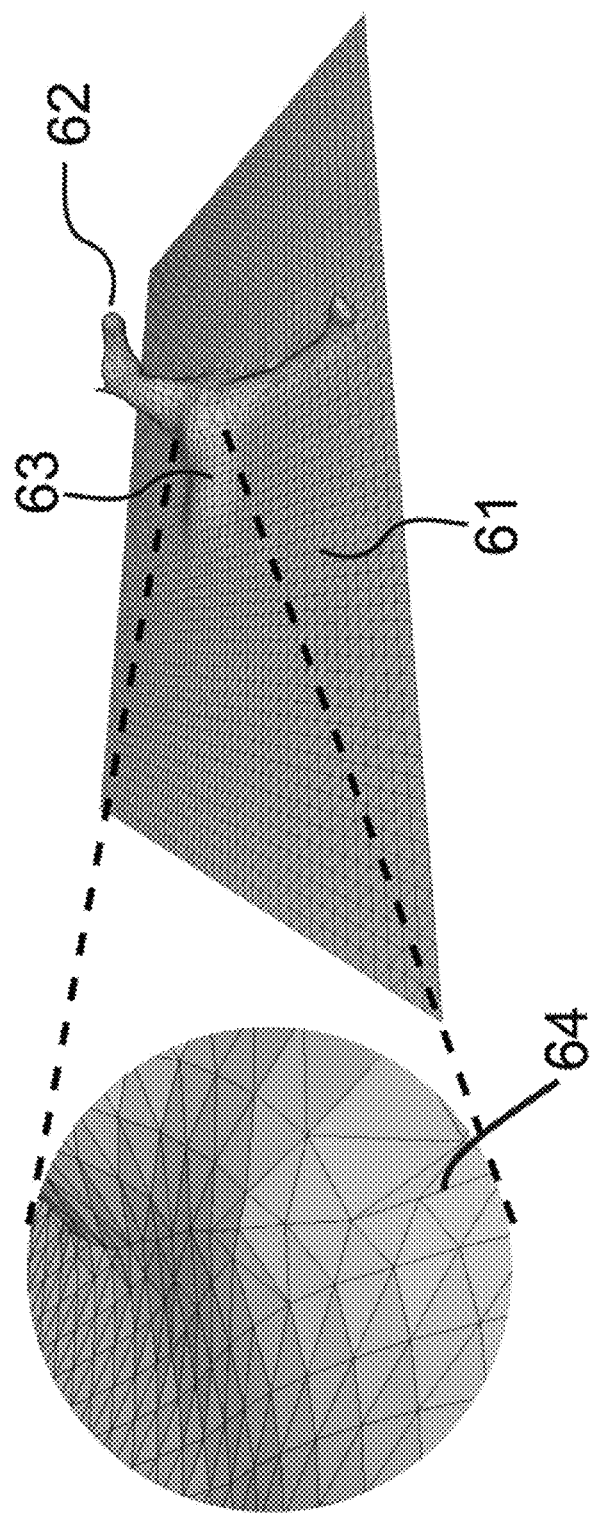
FIG. 6 shows the mesh of the 2D-3D composition after addition of the bas-relief and application of the smoothing operation between scene background, bas-relief and 3D object parts.

The term 2D-3D composition is used to describe a 2D-3D piece of art in terms of its surface mesh and texture. Such a surface mesh with texture can for example be described in the OBJ file format known in the art. A 2D-3D composition may also comprise a bas-relief part made of low-profile elements (FIG. 6, 63). The bas-relief part 63 is generally connected with both the flat part 61 and with the 3D part 62 of the 2D-3D composition. It ensures a smooth transition between itself, the flat part and the 3D part of the composition.

We consider an input scene comprising a salient object, also called scene object, that is to be reproduced partly as a 2D relatively flat part, e.g. flat and bas-relief, and partly as a 3D part. The terms 2D-3D piece of art, 2D-3D artwork and 2D-3D sculpture painting are used interchangeably. They specify a fabricated item representing a scene comprising a 2D substantially flat part (corresponding composition: FIG. 6, 61), a bas-relief part (corresponding composition: 63) and a 3D part (corresponding composition: 62), smoothly connected one to another 64. A 2D-3D composition may be sent to a 3D printing system to produce the corresponding 2D-3D sculpture painting. The term "region of interest" or "ROI" is used both for the part of the salient object in the original scene that is to be reproduced in 3D and for the part of the scene object actually reproduced as 3D in a 2D-3D sculpture painting. The context makes it clear whether "ROI" is the ROI in the original scene or the scaled and translated ROI instance of a 2D-3D composition.

Let us introduce the notations used hereinafter for specifying and modifying the surface meshes. We consider the rendering plane $P \in R^3$ and a 3D scene $M=\{V, F, E\}$ where $V=\{v_1, \ldots, v_n\} \in$ incorporates the Cartesian coordinates $v_i$ of n vertices. Each vertex $v_i \in V$ has the coordinates $v_i=[v_x, v_y, v_z]$. F denotes the set of faces, where each face $f_i$ is a triangle. E denotes the set of edges that form the faces. The scene is further defined by a camera position c, which is the center of projection of the scene. We cut the scene M with the user controlled cut plane H to determine the region of interest (ROI), which is denoted by $R=\{V_r, F_r, E_r\}$.

A sample setup of the scene is given in FIG. 1. A user positioned cut plane 12 separates the region of interest ("ROI") 13 of the object (horse) from the global scene 11. The scene 11 is rendered on the rendering plane 14 according to the camera position 15 (center of projection). The boundary of the ROI is formed by the vertices along the cut boundaries 16.

Extraction of Region of Interest (ROI) and Boundary

In order to extract the ROI, we first find the boundary on the input scene that follows the cut plane, then refine this boundary to create a smooth polygon, and finally detach the boundary. A simple solution such as intersecting the 3D mesh with a plane would yield jagged edges once the final result is viewed from directions other than the camera direction. Our method generates a boundary polygon ensuring the perception of a smooth transition when viewing the 2D-3D artwork both along the camera direction (FIG. 1, 17) and along directions substantially orthogonal (18) to the camera direction.

We define all faces of the scene that lay between the rendering plane and the cut plane as the ROI 13. In a preferred embodiment, the cut plane 12 is parallel to the rendering plane 14 and its position is specified by the user as a distance $h_z$ from the camera. Since the camera direction is parallel to the z axis of the world coordinate system, the z position of the cut plane $h_z$ is considered as the parameter governing the transition between the parts that will be projected onto the 2D rendering plane and the part that will be represented in 3D as the "ROI" emerging from the rendering plane.

Each face $f_i$ is defined as a ROI face if all of its vertices $v_i$ satisfy the following condition:

$$v_i(z) \leq h_z + \beta \cdot \mu \quad (1)$$

where $\beta \cdot \mu$ is the tolerance parameter, $\mu$ is the average edge length in the scene and $\beta$ is the control parameter, preferably $\beta=0.2$. The tolerance parameter enables including faces into the ROI that have vertices close to the cut plane.

Next, we find the boundary vertices $B=\{v_1^b, \ldots, v_m^b\}$, of the ROI, where $B \in V$ is the boundary polygon and m is the number of boundary vertices. Boundary edges are referenced only by a single triangle in the mesh, i.e. a boundary edge cannot be a common edge for more than one triangle. In order to find the boundary edges $E' \subset E$, we scan through all triangles in the mesh and take the edges having a single reference count. With a traversal of E', we then convert the edge set to an ordered polygon loop.

FIG. 2 shows the boundary 21 of the scene object (horse) for the given cut plane 24 and camera direction 25. Additional fixation boundaries 22 and 23 are defined for the refinement process that is applied in the next step.

As it can be seen in FIG. 2 24, the ROI boundary 21 is not perfectly aligned with the cut plane due to the structure of the original mesh geometry. Leaving the ROI like that would result in continuity problems regarding the mesh geometry and the texture when attaching the ROI to the rendering plane. Therefore, we refine the ROI boundary to be aligned with the cut plane and smooth it to ensure that its projection on the rendering plane is a smooth polygon. Such a smooth polygon enables creating a smooth mesh having a smooth appearance when viewed from many viewing directions.

We use differential coordinates to make deformations on the ROI boundary as rigid as possible. We calculate the differential coordinates $\Delta v_i$ for each vertex $v_i$ as described by Sorkine et al. [6], hereinafter included by reference. Then, we change the positions $v^b$ of the boundary vertices. We first change the z coordinates of all the ROI boundary vertices to the z coordinate $h_z$, of the cut plane. Next we smooth the x and y coordinates of the ROI boundary vertices separately by applying a 1D Gaussian kernel on the boundary polygon B.

To limit the deformations in the scene, we define two additional boundaries called "fixation boundaries", shown in FIGS. 2, 22 and 23. We put their original positions of as constraints into our optimization function. This ensures that only the vertices between the fixation boundaries change. Then we solve the following optimization function in order to obtain the refined mesh geometry of the 3D scene, where E is the scalar multivalued function to minimize:

$$E(v_1, \ldots, v_n) = \sum_{i=1}^{n} \|\Delta v_i' - \Delta v_i\|^2 + \sum_{j=1}^{m} \|v_j^{b'} - \Delta v_j^b\|^2 + \sum_{k=1}^{d} \|v_k^{f'} - v_k^f\|^2 \quad (2)$$

The first term in the optimization minimizes the square differences between original differential coordinates $\Delta v_i$ and the differential values of the refined geometry $\Delta v_i'$. The second term minimizes the differences between the smoothed m boundary positions $v^b$ and the final boundary positions on the refined geometry. The third term minimizes the variations on the d fixation boundaries $v^f$. This optimization problem is solved as a sparse linear systems of equations [6]. We thus obtain the refined scene with the smoothed boundary.

Figure 3:
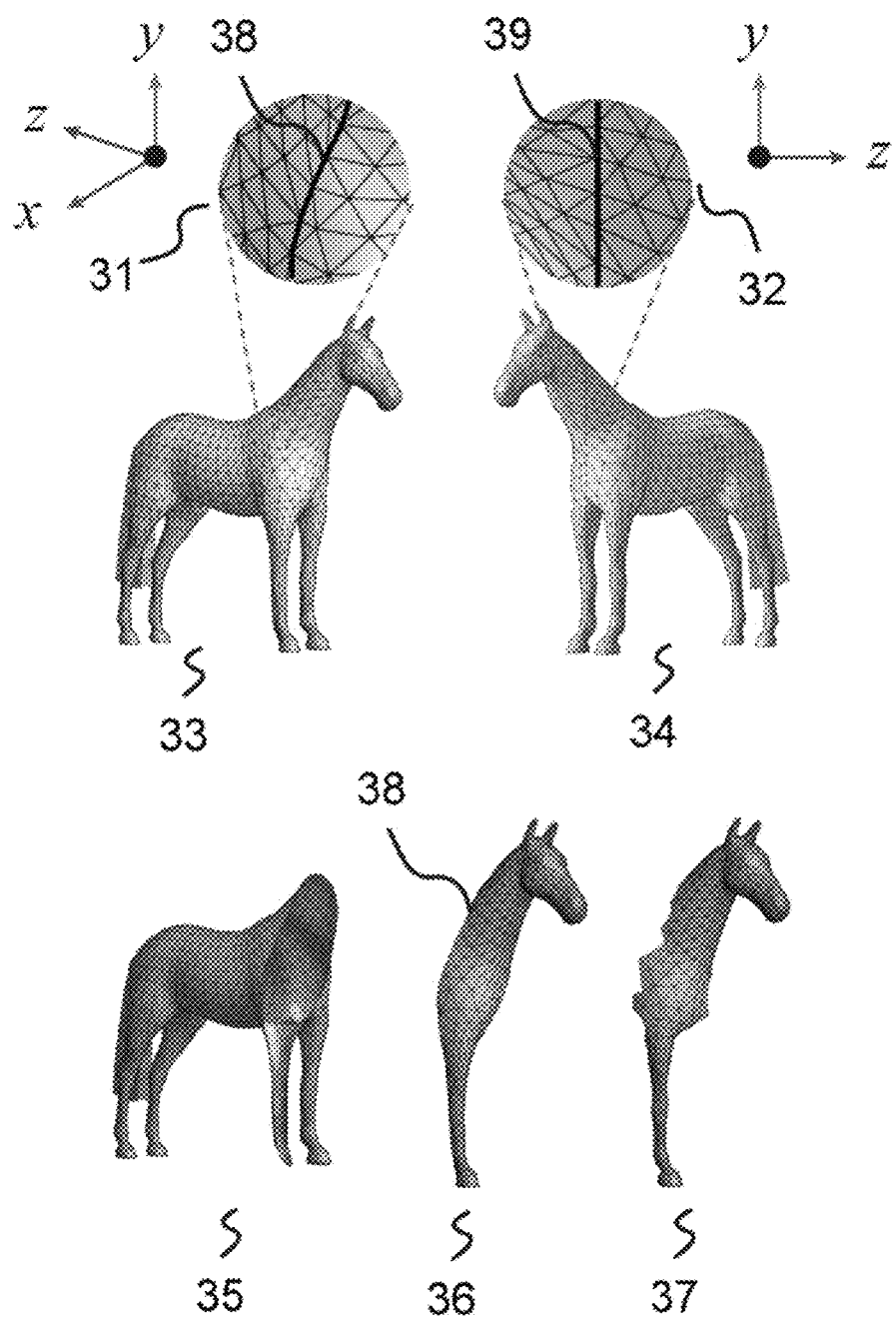
FIG. 3 shows how the 3D part of the object would look before the boundary refinement process 37, how it looks after the boundary refinement process 36 and also shows the boundary 38 of the region of interest 36 after the refinement process.

FIG. 3 shows the refined geometry 33, 34 with the smooth boundary regions 31, 32. Once the region of interest (ROI) 36 of the object is separated from the remaining part of the object 35, the resulting boundary 38 along the cut position becomes very smooth compared to cutting without refinement 37.

Preparation of the Rendering Plane

We create a grid to represent the rendering plane and define attachment points for the ROI. First, we find the projection of the ROI boundary onto the rendering plane. Then we find the average boundary edge length a on the rendering plane:

$$a = \frac{\sigma}{m}\sum_{i=1}^{m} \|b_i' - b_{i+1}'\|$$

$$q = \frac{w}{a}$$

$$r = \frac{h}{a} \quad (3)$$

where $\sigma$ is the density factor, q is the number of columns, r is the number of rows, w and h are the width and the height of the rendering plane, respectively, and b' denotes a projected vertex of the ROI boundary.

Figure 4:
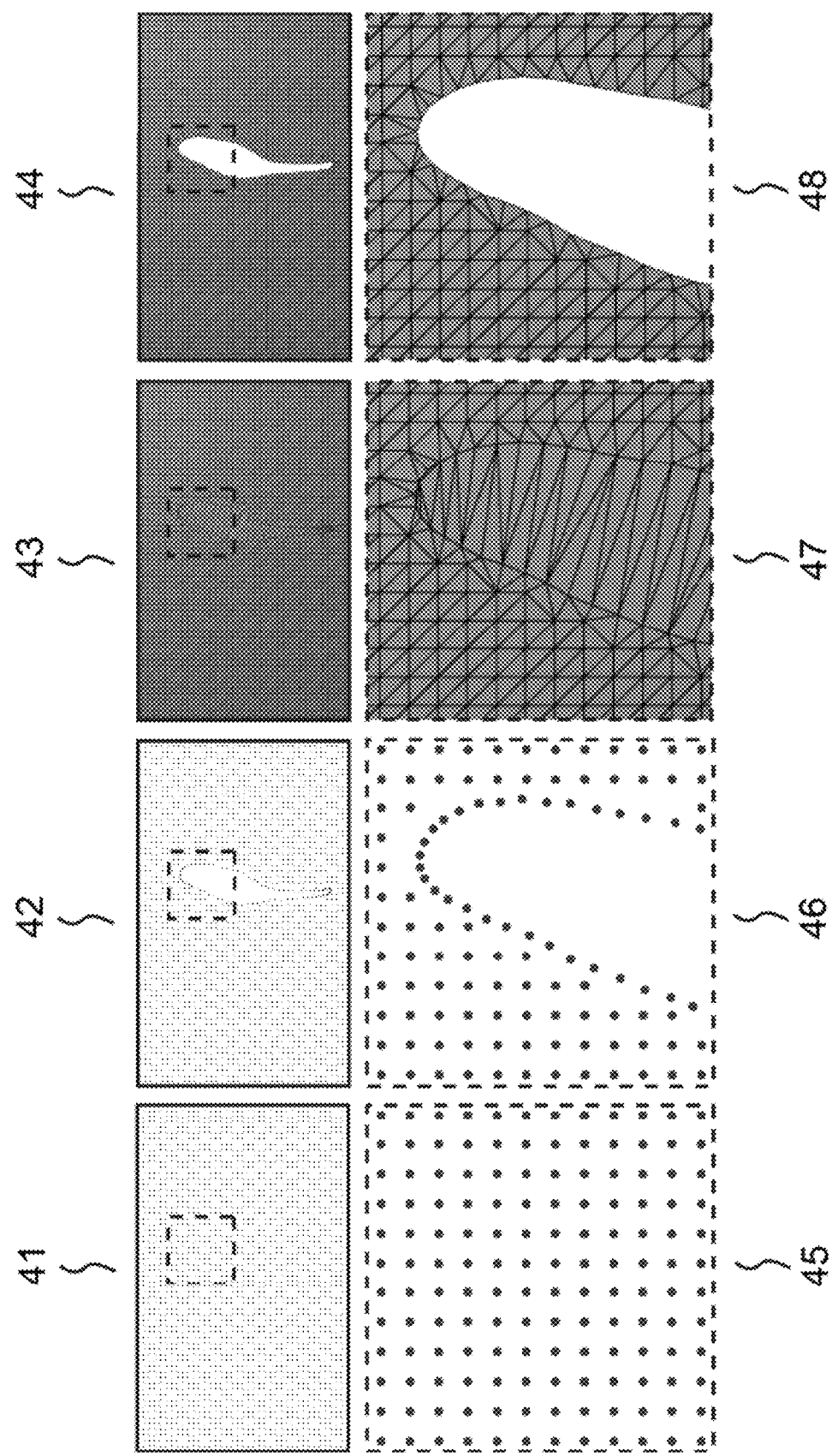
FIG. 4 shows the mesh of the rendering plane with border vertices 42 (zoom 46) and the triangulated resulting mesh 44 (zoom 48)

We create q×r points that are equally distributed over the rendering plane as shown in FIG. 4 41, zoom 45. Then, we add the projected boundary vertices on the grid and remove all vertices inside the polygon that is formed by the projected boundary (FIG. 4 42, zoom 46). We also eliminate all points that have a distance to the boundary polygon of less than $$\frac{a}{2}.$$

This yields a grid (42, zoom 46) with a hole whose border follows the projected boundary of the ROI.

Then, we apply a Delaunay triangulation over the grid points to obtain a mesh surface (FIG. 4 43, zoom 47). Finally we remove all triangles that reside within the boundary polygon. For this purpose, we remove all faces whose vertices are all boundary vertices. After this operation, we obtain our final rendering plane which is ready for attachment of the scaled and translated ROI instance (FIG. 4 44, zoom 48).

Attaching the ROI

Figure 5:
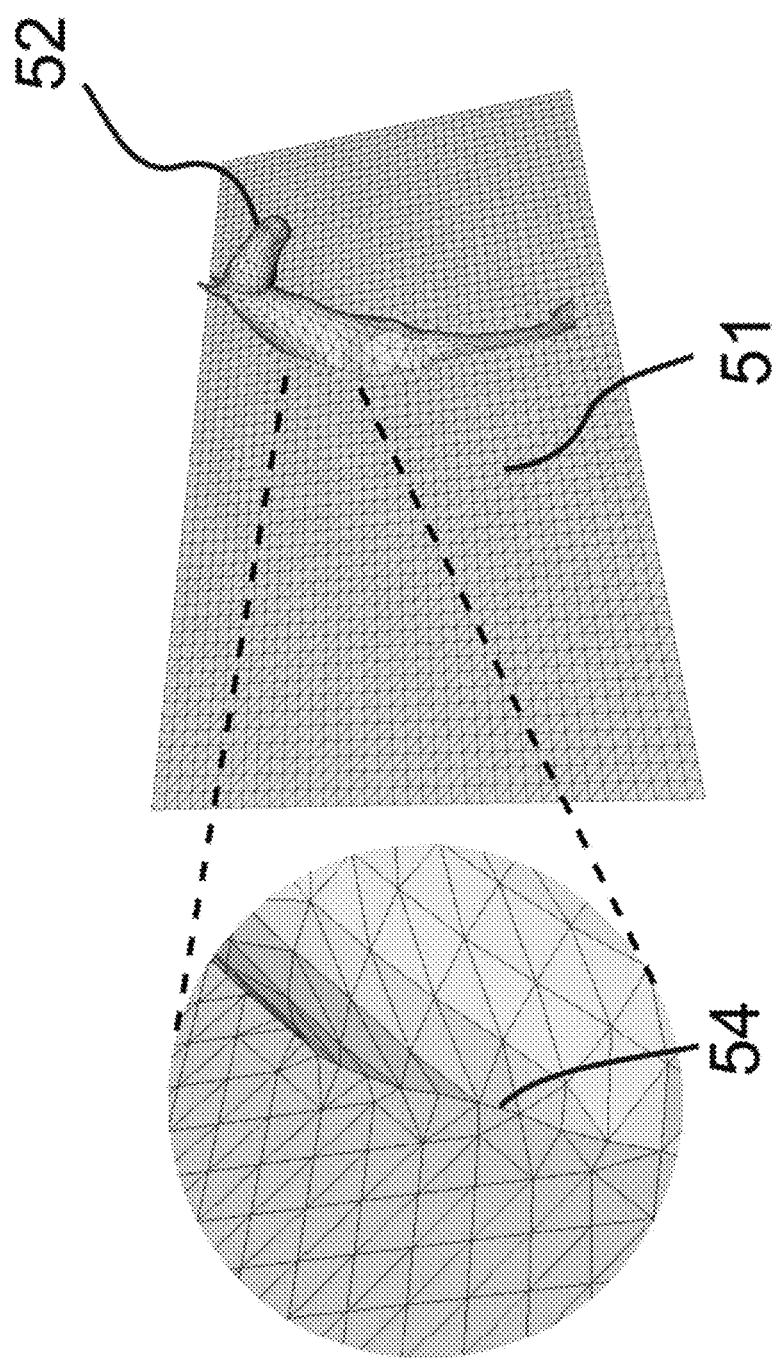
FIG. 5 shows the mesh of the 2D-3D composition after attachment of the region of interest (ROI)

In order to get a final fully connected surface, we need to attach the ROI to the rendering grid. First we scale and translate the ROI in order to match its boundary with the hole border previously created on the rendering grid. After aligning the hole border vertices with the scaled and translated ROI boundary vertices, we merge the vertices and faces of the scaled and translated ROI with the vertices and faces of the rendering grid (44, zoom 48). Finally, we unite all corresponding pairs of boundary vertices and create the same index references to them from the face list. This face list now contains the faces both from the 2D flat grid (FIG. 5, 51) and from the scaled and translated ROI 52. In this way, we obtain a surface in which the scaled and translated ROI is fully connected along its boundary to the rendering plane (FIG. 5). From now on, the scaled and transformed ROI is simply called ROI.

Incorporating Bas-Relief Profiles and Carrying Out the Optimization

In order to create a smoother transition between the 2D and the 3D elements of the scene object, we incorporate a bas-relief onto the region of the scene object to be rendered in 2D (called "non-ROI part of the object") and refine the attached ROI accordingly.

First, we find the corresponding bas-relief elevations on the rendering grid. To do that, we extract the depth map of the non-ROI part of the scene object and find the corresponding elevations $v_i^d$ for each grid point. Then, similar to the method of Weyrich [3], we calculate the gradient $$\left( \frac{\partial v_i^d}{\partial x}, \frac{\partial v_i^d}{\partial y} \right)$$

of each grid point by taking the backward differences with their neighbouring vertices in x and y directions. In order to find silhouette vertices, we use the magnitude of the gradients:

$$\left\| \left( \frac{\partial v_i^d}{\partial x}, \frac{\partial v_i^d}{\partial y} \right) \right\| > s \quad (4)$$

where any vertex that has a larger gradient magnitude than the silhouette threshold s is considered to be a silhouette vertex.

Next we assign the depth values $v_i^d$ to the flat part of the attached object as z coordinates. We then find the differential coordinates of the new attached geometry as presented in reference [6]. Then, we change the z coordinate of silhouette vertices $v_i^s$ to ensure that they have zero elevation from the rendering plane and set them as constraints in our optimization function, with E being the multivariate function to minimize:

$$E(v_1(z), \ldots, v_n(z)) = \sum_{i=1}^{n} \|\Delta v_i'(z) - \Delta v_i(z)\|^2 + \sum_{j=1}^{h} \| v_j^{s'}(z) - v_j^{s}(z) \|^2 \quad (5)$$

where h is the number of silhouette vertices. The first term of the optimization aims at preserving the differential values of the original ROI and the differential values of the newly assigned depth elevations of the non-ROI part of the object. The second term aims at enforcing that the silhouette vertices of the non-ROI part of the object do not have any elevation from the rendering plane. Then the sparse linear system is solved to obtain the resulting surface mesh shown in FIG. 6. Note that since it is an optimization, the differential values will be kept similar to the initial ones and the elevation values of the silhouette vertices will be kept close to zero. Note also that due to the optimization, some non-ROI parts of the object may become substantially flat. For example, in FIG. 6, the back legs of the horse are reproduced as flat elements.

Textures

We use two different texture maps for the final geometry. One is defined for the 2D part of the rendering grid including the bas-relief non-ROI part of the object and the second is for the 3D part which is the ROI of the object.

For the 2D part of the rendering grid, we use our main scene. After eliminating from the scene the ROI part of the object (FIG. 3 35), we render it on the rendering plane. We use the rendered 3D scene image as our texture map for the flat part. UV coordinates are calculated by simply scaling the original x and y coordinates of the rendering plane to fit the interval between 0 and 1.

For the 3D part of the object, we use the original texture map and UV coordinates. Since, up to a scaling factor, we keep the original geometry and connectivity of the 3D part, the original UV coordinates do not create any problem except negligible deformations along the boundary of the ROI.

To avoid lighting contradictions between the ROI and the flat region, we bake the shading effects present in the scene onto the original texture of the scene. Texture baking enables transposing lighting effects of a 3D geometry into an image texture. First, we set the lighting conditions and bake the texture of the scene. Then, we render the non-ROI part on the rendering plane using the newly baked texture, illuminated with ambient light. For the 3D ROI part, the baked texture is directly used. It forms the texture of the surface of the 3D part within the 2D-3D composition.

Results

We can generate a great variety of sculpture paintings. The results can be obtained with minimal user intervention as soon as an appropriate scene and cut plane position is provided. A great effort would be required from an artist to render the 2D part and match the 3D part on the same plane. Thanks to the execution of software functions, we automatically create a smooth transition both in respect to the mesh geometry and to the texture. The resulting 2D-3D composition is a mesh that can be transferred to a 3D printing system for generating by 3D printing the corresponding 2D-3D sculpture painting. The 2D-3D composition can also be used to create a mould. Such a mould may then be used to fabricate for example by injection many copies of 2D-3D sculpture painting. The injected material can be selected, e.g. plastic, metal, glass or ceramic.

After production, the 2D-3D piece of art called sculpture painting can be observed from a great variety of angles. Each angle provides a different interpretation of the composition. However, the extent to which the view is plausible depends on the content. Scenes including elastic and self-moveable content such as a horse, a deer, or a shark can be seen from more viewing angles, i.e. they have a larger view-independence than scenes with solid elements such as cars, buildings, or furniture. For views with solid elements, when the viewer changes its position, the new composition is perceived as if the object has changed its pose. However, since this kind of self movement is not possible for solid objects, they might be perceived as deformed or broken. In a preferred embodiment, the 3D part of a sculpture painting is a substantially similar instance of the original geometry. Perceptually, it is the dominant part of the composition. Its enables perceiving a consistent 2D-3D piece of art from many viewing positions and angles.

Figure 7:
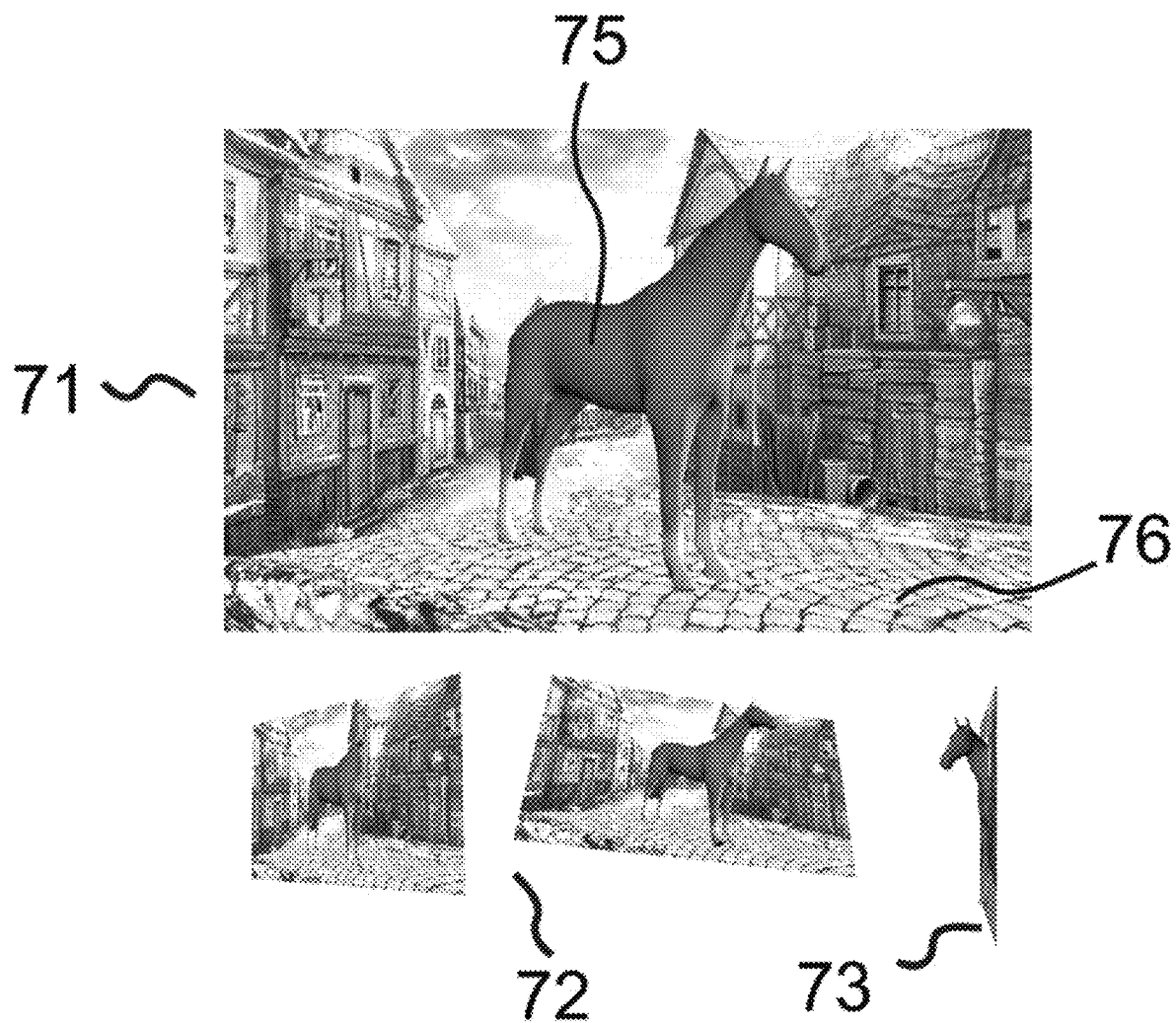
FIG. 7 shows an example of a sculpture painting viewed from different locations with a cut plane through the neck of the horse.
Figure 8:
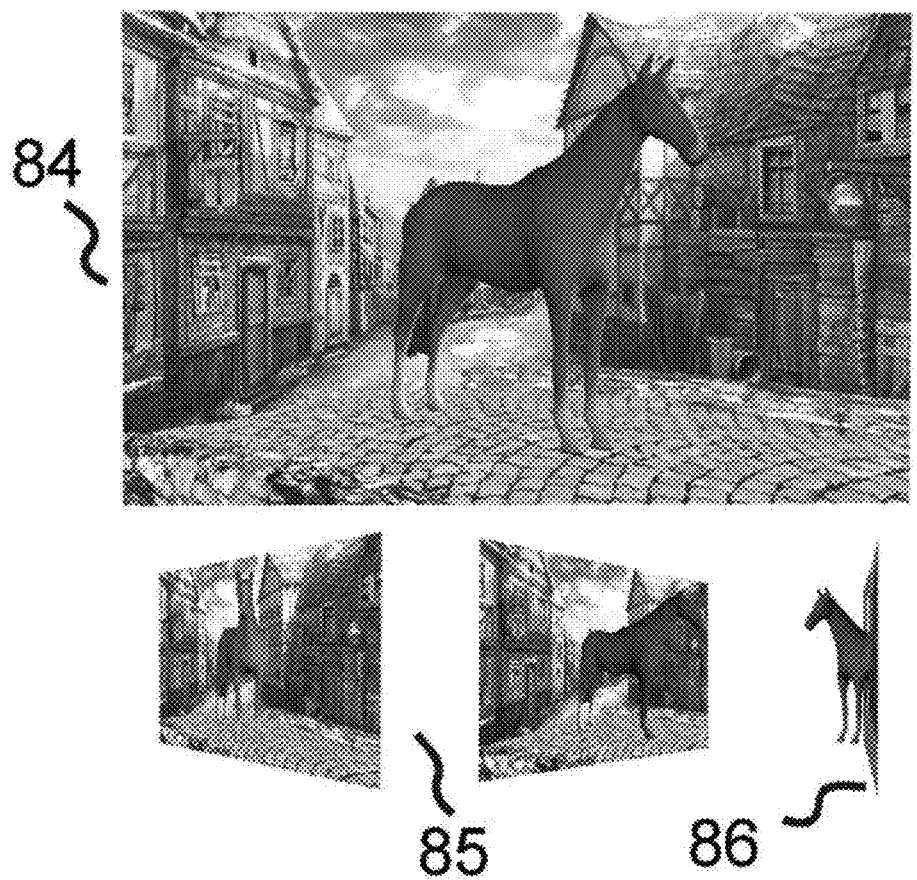
FIG. 8 shows a sculpture painting similar to the one of FIG. 7, but with the cut plane through the body of the horse.

FIGS. 7 and 8 show sculpture paintings generated with the same horse model (surface mesh), according to different cut positions. In FIG. 7, only the neck and head of the horse is in 3D whereas in FIG. 8, half the body of the horse is in 3D. In both scenarios, the sculpture paintings are perceived as continuous when viewed from different positions (see 71 and 72, 84 and 85). By viewing the sculpture painting from the side, the 3D parts 73 and 86 of the salient objects can be observed.

Figure 9:
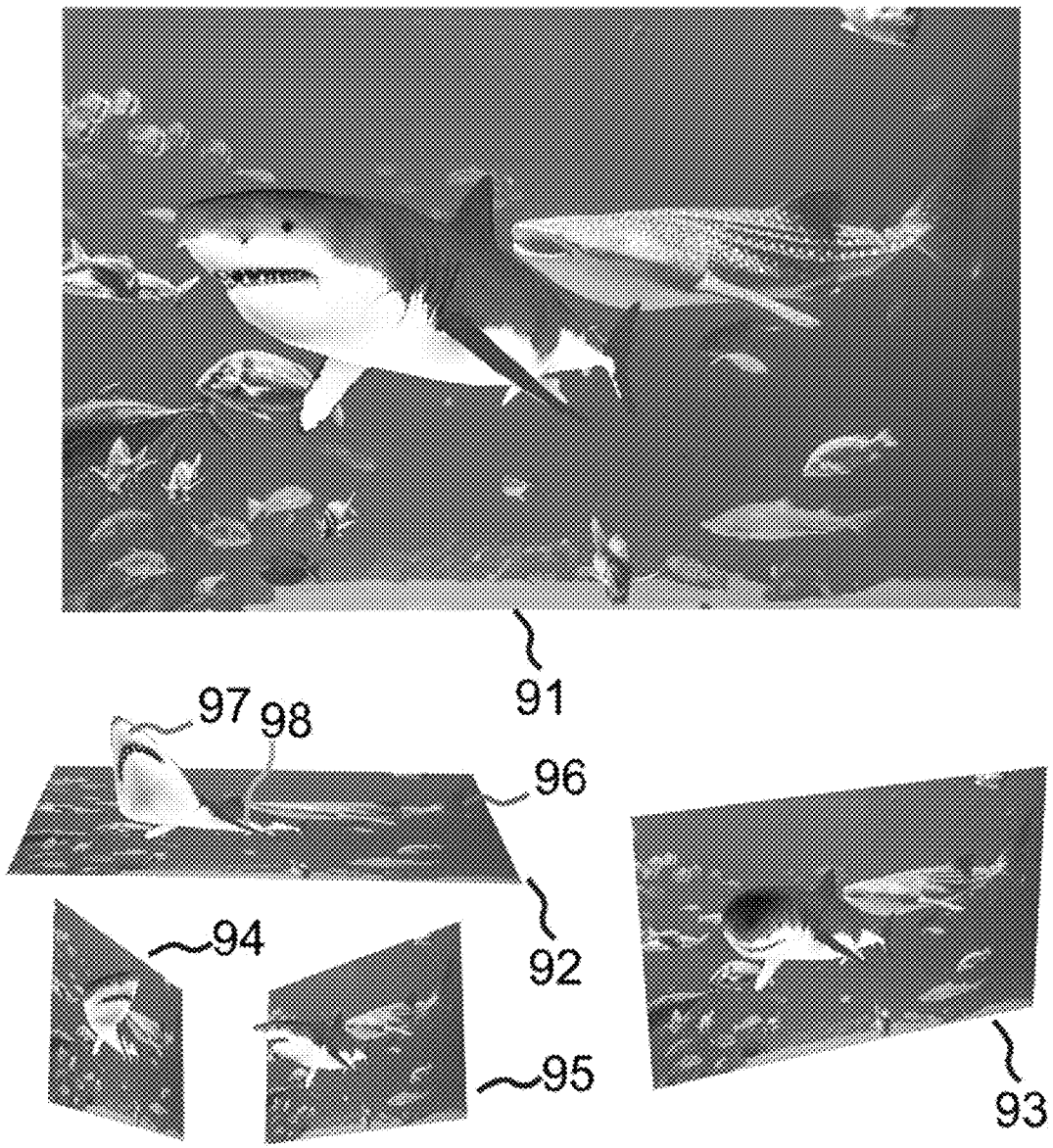
FIG. 9 shows a sculpture painting with a shark emerging slightly as bas-relief and strongly in 3D from the rendering surface, viewed from different angles.

In FIG. 9, a shark surface mesh model is used to generate the sculpture painting 91. This 2D-3D sculpture painting offers a consistent appearance from many viewing positions 91, 93, 94, 95. When looking at the sculpture painting from the side (92) one may recognize without ambiguity the part 97 of the shark salient object that emerges as 3D from the 2D scene background 96 and from the bas-relief part 98.

Figure 10:
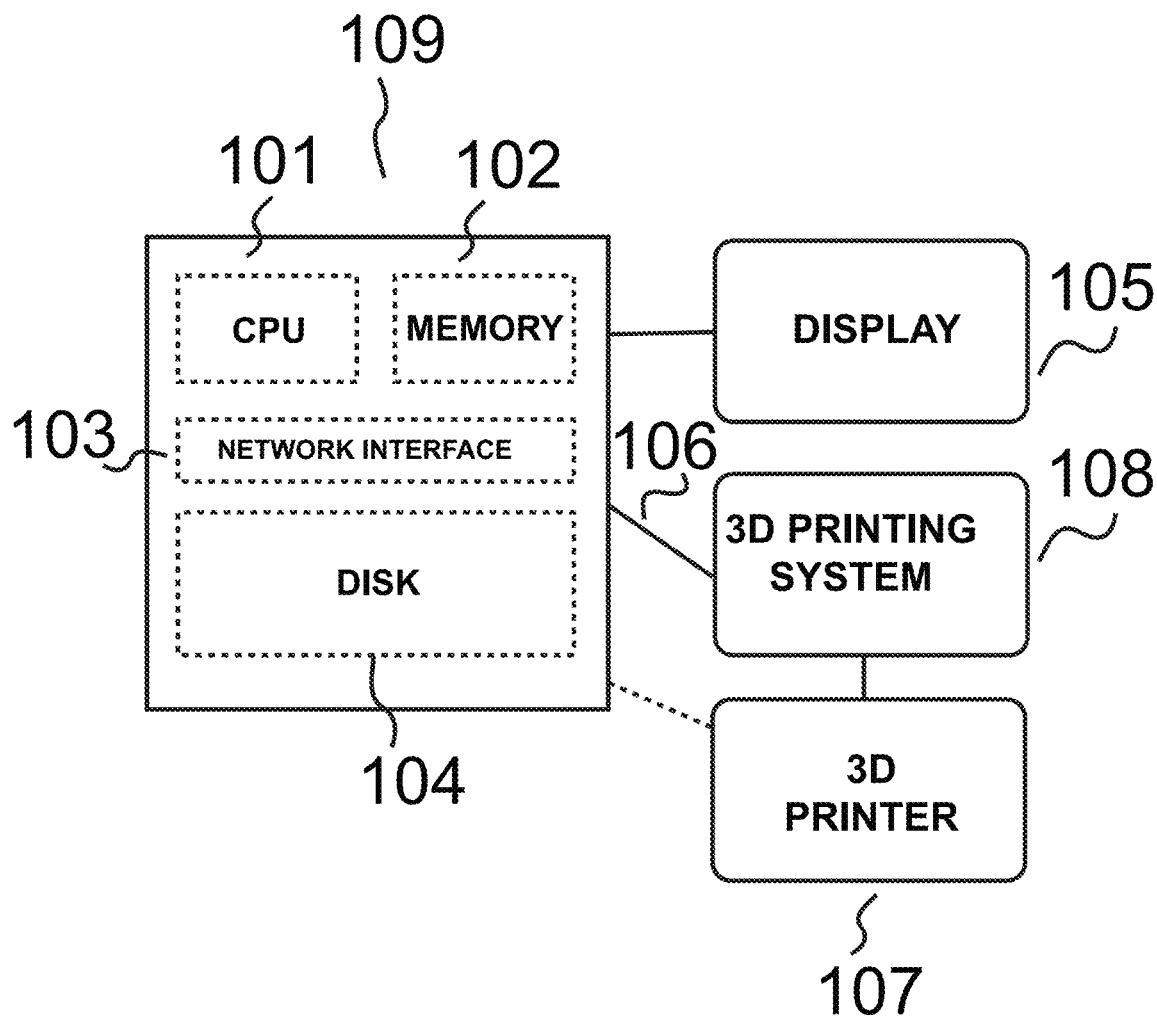
FIG. 10 shows a computing system operable for synthesizing and 3D printing of sculpture paintings.

Computing System Operable for Synthesizing 2D-3D Compositions and for Printing the Corresponding 2D-3D Pieces of Art The computing system (FIG. 10) operable for composing a 2D-3D piece of art comprises a central processing unit (CPU) 101, a memory 102, a non-volatile memory such as a disk 104, a network interface 103, possibly a display 105, a network 106, as well as a 3D printing system 108 interacting with a 3D printer 107. The 3D printing system software can run on a computer 108 separate from the system for synthesizing 2D-3D compositions or run on the same system 109.

A 2D-3D composition is described by a continuous surface mesh (FIG. 6) and by the texture of the 2D part including the bas-relief part and the texture of the 3D part. They are sent to a 3D printing system for conversion into printable slices that are then printed by a 3D printer 107. For more information on the conversion from surface meshes (expressed for example as OBJ files) to 3D printable slices, see [7], herein incorporated by reference.

Applications

Thanks to the recent developments in multi-color 3D printing, it is possible to manufacture color sculpture paintings. These 2D-3D pieces of art are especially attractive for gifts and decoration. The smooth integration of an object, partly reproduced as 3D and partly as a 2D bas-relief and partly as flat, well integrated into the surrounding background of the scene provides slightly different views when observed from different viewing positions and therefore offers a highly valuable aesthetic experience. When children observe such 2D-3D sculpture paintings, their phantasy is activated. They can imagine and play as if they would be part of the represented scene.

CITED NON PATENT PUBLICATIONS

All the publications cited below are herein incorporated by reference.
1. Paolo Cignoni, Claudio Montani, and Roberto Scopigno. "Computer-assisted generation of bas- and high-reliefs." *Journal of graphics tools* Vol. 2. No. 3 (1997): 15-28.
2. Wenhao Song, Alexander Belyaev, and Hans-Peter Seidel. "Automatic generation of bas-reliefs from 3d shapes." *Shape Modeling and Applications,* 2007. SMI'07. IEEE International Conference on. IEEE, 2007.
3. Tim Weyrich, Jia Deng, Connelly Barnes, Szymon Rusinkiewicz, Adam Finkelstein, "Digital bas-relief from 3D scenes." *ACM Transactions on Graphics (TOG)* Vol. 26, No. 3 article 32, 2007.
4. Christian Schüller, Daniele Panozzo, and Olga Sorkine-Hornung. "Appearance-mimicking surfaces." *ACM Transactions on Graphics (TOG)* Vol. 33, No. 6, article 216, 2014.
5. Sami Arpa, Sabine Süsstrunk, and Roger D. Hersch. "High reliefs from 3D scenes", *Computer Graphics Forum*, Vol. 34. No. 2. 2015, pp. 253-263.
6. O. Sorkine, D. Cohen-Or, Y. Lipman, M. Alexa, C. Rössl, and H.-P. Seidel, "Laplacian surface editing." *Proceedings of the* 2004 *Eurographics/ACM SIGGRAPH symposium on Geometry processing*. ACM, 175-184, 2004.
7. Mitch Heynick and Ivo Stotz, "3D CAD, CAM and Rapid Prototyping", LAPA Digital Technology Seminar, EPFL, May 2007.

The invention claimed is:

1. A method for composing by computation a 2D-3D piece of art comprising a scene with a salient object, where the portion of scene surrounding said salient object is rendered on a rendering plane as a flat 2D reproduction, and where the salient object is reproduced partly as flat, partly as bas-relief and partly as 3D, the method comprising the steps of:
   (i) intersecting the salient object surface with a cut plane thereby obtaining on one side of the cut boundary a region of interest of the object which forms the part of the salient object to be reproduced in 3D,
   (ii) aligning and smoothing the cut boundary of said region of interest along the cut plane,
   (iii) creating a grid on the rendering plane and a hole on this grid whose border matches the cut boundary of the region of interest,
   (iv) attaching the region of interest to the rendering grid at the border of said hole,
   (v) adding a bas-relief profile to a part of the salient object outside of the region of interest and ensuring smoothness between flat, bas-relief, and 3D parts of said salient object.

2. The method of claim 1, where adding a bas-relief profile and ensuring smoothness between the flat, bas-relief and 3D object parts is carried out by an optimization procedure that also ensures that the silhouette of the object part outside the region of interest remains close to the rendering plane.

3. The method of claim 1, where the surface of said salient object is formed by a mesh defined by its vertices and edges, where aligning and smoothing the cut boundary along the cut plane is carried out both by forcing boundary vertices of the region of interest to be located close to the cut plane and by refining the location of the mesh vertices by applying an optimization procedure that minimizes differences between original differential coordinates of the mesh vertices and differential coordinates of the refined mesh vertices.

4. The method of claim 2, where said silhouette is obtained by selecting vertices having a high gradient of the depth profile of said object part part outside of the region of interest.

5. The method of claim 1, where an additional step comprises the mapping of the texture of the input scene without the region of interest onto the flat and the bas relief parts of said piece of art and the preservation of the original texture of the region of interest on the 3D part of said piece of art.

6. The method of claim 5, where illumination conditions are defined within the input 3D scene and where the resulting illuminated surface shades are baked onto the texture of the reproduced scene.

7. The method of claim 6, where both the surface mesh description and the texture description are sent to a 3D color printing system operable for 3D printing of the colored piece of art.

8. The method of claim 1, where the resulting 2D-3D composition of the scene with the salient object is specified by a surface mesh description and where said surface mesh description is sent to a 3D printing system which manufactures an instance of said piece of art by 3D printing of a material selected from the set of plastic, metal, glass and ceramic.

9. A 2D-3D piece of art representing a scene, said scene comprising a salient object, where the scene portion surrounding the object is rendered as a substantially flat 2D reproduction, where the salient object is reproduced partly as flat, partly as bas-relief and partly as 3D and where the transition between the flat, bas-relief and 3D parts of the object is smooth, thereby making it difficult for an observer looking at said piece of art to perceive the exact locations of the transitions between said flat, bas-relief and 3D parts of the object.

10. The 2D-3D piece of art of claim 9 manufactured by having the surface mesh description of its 2D-3D composition sent to a 3D printing system that converts said surface mesh description into successions of surface slices that are printed by a 3D printer.

11. The 2D-3D piece of art of claim 9 where said scene is colorful and where said salient object has colors different from the colors of the surrounding scene parts.

12. The 2D-3D piece of art of claim 9, where, when said observer looks at said piece of art from the side, the 3D part of the object becomes apparent by standing out of the 2D scene elements.

13. The 2D-3D piece of art of claim 9, where the salient object reproduced partly as flat, partly as bas-relief and partly as 3D is selected from the set of animals, vegetals, humans, fashion objects, fictional characters, vehicles, bottles, machines, robots, landscape elements, buildings, houses and furniture.

14. The 2D-3D piece of art of claim 9, where the object reproduced partly as flat, partly as bas-relief and partly as 3D is a composite object comprising several connected parts selected from the set of animals, vegetals, humans, fashion objects, fictional characters, vehicles, bottles, machines, robots, landscape elements, buildings, houses and furniture.

15. The 2D-3D piece of art of claim 9, where said piece of art is produced by injection into a mould of a material selected from the set of plastics, metals, ceramics and glass.

16. A computing system for composing by computation a 2D-3D piece of art comprising a scene with a salient object, where the scene portion surrounding the object is rendered as a flat 2D reproduction, and where the salient object is reproduced partly as flat, partly as bas-relief and partly as 3D, the computing system comprising software functions operable for:
  (i) intersecting the salient object surface with a cut plane thereby obtaining on one side of the cut boundary a region of interest of the object which forms the part of the salient object that is to be reproduced in 3D,
  (ii) aligning and smoothing the cut boundary of said region of interest along the cut plane,
  (iii) creating a grid on the rendering plane and a hole on this grid whose border matches the cut boundary of the region of interest,
  (iv) attaching the region of interest to the rendering grid at the border of said hole,
  (v) adding a bas-relief profile to a part of the salient object outside the region of interest and ensuring smoothness between the flat, bas-relief and 3D object parts.

17. The computing system of claim 16 where adding a bas-relief profile and ensuring smoothness between the flat, bas-relief object and 3D object parts is carried out by an optimization procedure that also ensures that the silhouette of the object part outside the region of interest remains close to the rendering plane.

18. The computing system of claim 16 where the surface of said object is formed by a mesh defined by its vertices and edges, where aligning and smoothing the cut boundary along the cut plane is carried out by forcing cut boundary vertices to be located close to the cut plane and by refining the location of the mesh vertices by applying an optimization procedure that minimizes differences between original differential coordinates of the mesh vertices and differential coordinates of the refined mesh vertices.

19. The computing system of claim 18 where the software function for adding the bas relief profile determines the bas relief object silhouette by selecting vertices of the part of the object outside the region of interest having a high gradient of its depth profile and where an additional software function is operable for mapping the texture of the original scene outside the region of interest onto the flat and the bas relief parts of said piece of art and operable for preserving the original texture of the region of interest on the 3D part of said piece of art.

20. The computing system of claim 19 where the designer of the 2D-3D piece of art can define lighting conditions and where an additional software function is operable for baking the resulting lighting effects into the texture.

21. The computing system of claim 16, where the surface mesh description and the texture description of the 2D-3D composition are sent to a 3D color printing system operable for 3D color printing of said 2D-3D piece of art.

22. The computing system of claim 21 where the salient object rendered partly as flat, partly as bas-relief and partly as 3D object is a composite object comprising several connected parts selected from the set of animals, vegetals, humans, fashion objects, fictional characters, vehicles, bottles, machines, robots, landscape elements, buildings, houses and furniture.

* * * * *